(12) United States Patent
Wang et al.

(10) Patent No.: US 8,111,440 B2
(45) Date of Patent: Feb. 7, 2012

(54) STRUCTURE AND METHOD FOR MODULATING LIGHT

(75) Inventors: Shih-Yuan Wang, Palo Alto, CA (US); Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 570 days.

(21) Appl. No.: 11/789,816

(22) Filed: Apr. 26, 2007

(65) Prior Publication Data

US 2008/0266640 A1   Oct. 30, 2008

(51) Int. Cl.
*G02B 26/00* (2006.01)
*G02F 1/00* (2006.01)
*G02F 1/03* (2006.01)
*G02F 1/07* (2006.01)

(52) U.S. Cl. ........................................ 359/237; 359/248
(58) Field of Classification Search .......... 359/240–241, 359/321, 322, 237–238, 244–248, 276; 257/290; 372/43.01–50.23, 26; 977/827, 834; 385/2, 385/3, 14, 45, 130–132
See application file for complete search history.

(56) References Cited

U.S. PATENT DOCUMENTS

| | | | | | |
|---|---|---|---|---|---|
| 3,475,609 | A | * | 10/1969 | Schneider | 359/245 |
| 5,157,537 | A | * | 10/1992 | Rosenblatt | 359/245 |
| 5,173,956 | A | * | 12/1992 | Hayes | 385/16 |
| 5,337,183 | A | * | 8/1994 | Rosenblatt | 359/248 |
| 5,625,729 | A | * | 4/1997 | Brown | 385/31 |
| 6,040,936 | A | * | 3/2000 | Kim et al. | 359/245 |
| 7,170,142 | B2 | | 1/2007 | Wojcik et al. | |
| 7,423,254 | B2 | * | 9/2008 | Arend et al. | 250/214.1 |
| 2007/0127037 | A1 | * | 6/2007 | Yamada et al. | 356/614 |
| 2007/0262405 | A1 | * | 11/2007 | Furuyama | 257/432 |
| 2007/0289623 | A1 | * | 12/2007 | Atwater | 136/252 |
| 2008/0212102 | A1 | * | 9/2008 | Nuzzo et al. | 356/445 |
| 2008/0226217 | A1 | * | 9/2008 | Kilic et al. | 385/12 |
| 2009/0052827 | A1 | * | 2/2009 | Durfee et al. | 385/2 |
| 2009/0146081 | A1 | * | 6/2009 | Stark | 250/492.2 |

OTHER PUBLICATIONS

Barnes, W.L. et al., "Surface Plasmon Subwavelength Optics", Nature Publishing Group, vol. 424, Aug. 2003.
Ebbesen, T.W. et al., "Extraordinary Optical Transmission Through Sub-Wavelength Hole Arrays", Macmillan Publishers Ltd, vol. 391, Feb. 1998.
Genet, C. et al., "Light in Tiny Holes", Nature Publishing Group, vol. 445, Jan. 2007.
Hellemans, A., "Nanoholes Permit Remarkable Light Transmission", IEEE Spectrum, Jul. 2004.
Hochberg, M. et al., "Integrated Plasmon and Dielectric Waveguides", Optics Express, vol. 12, No. 22, Nov. 2004.
Lezec, H.J. et al., "Beaming Light from a Subwavelength Aperture", Science, vol. 297, Aug. 2002.
Radulovic, K. et al., "Electromagnetic Progation Through Subwavelength Hole or Slit Arrays in Thick Metal Layer Covered with Dielectric Nanofilm", TELFOR Nov. 2006.

* cited by examiner

*Primary Examiner* — Ricky Mack
*Assistant Examiner* — Mahidere Sahle

(57) ABSTRACT

A structure includes a film having a plurality of nanoapertures and a semiconductor layer in connection with the film. The nanoapertures are configured to allow the transmission of a predetermined subwavelength of light through the film via the plurality of nanoapertures. The semiconductor layer facilitates the modulation of the predetermined subwavelength of light transmitted through the film. The structure also includes a carrier generator for modulating the predetermined subwavelength of light by generating charge carriers.

16 Claims, 7 Drawing Sheets

STRUCTURE AND METHOD FOR MODULATING LIGHT

STATEMENT REGARDING FEDERALLY SPONSORED RESEARCH OR DEVELOPMENT

This invention has been made with government support under Contract No. HR0011-05-3-002, awarded by Defense Advanced Research Projects Agency. The goverment has certain rights in the invention.

BACKGROUND

Recently, optical modulators and waveguides have garnered increased attention for a variety of applications, especially in data transmission, processing, and interconnects, with the thrust towards nanophotonics. One application of optical modulators is the transmission of information on computer chips. The trend is toward using wavelength division multiplexing (WDM) to transmit data in an optical system. WDM is a technology which multiplexes multiple optical carrier signals on a single optical fiber by using different wavelengths, i.e., different colors of light, to carry different signals. This allows for a multiplication in capacity, in addition to making it possible to perform bidirectional communications over one strand of fiber. Optical modulators that may be used for WDM systems have the ability to modulate at specific wavelengths. However, conventional optical modulators are generally less wavelength sensitive. Modulators that are fabricated from lithium niobate generally are broadband and can modulate at different wavelengths, ranging from infrared to visible. But, these modulators, like other modulators, such as electro-absorption and micro-ring, suffer from issues in material compatibilities, optical coupling issues, and are complex to fabricate. Thus, due to the limitations of conventional optical modulators and other components of the conventional optical transmission system, such as detectors, different nano-wavelengths of light may not be used for the transmission of information.

One form of optical modulator, Schottky barrier modulators, typically include a semiconductor, such as silicon, or any III-V material such as GaAs, InP, AlGaAs, InGaAsP, GaN, InGaN, with an over-lying metal Schottky electrode. The interface between the semiconductor and the Schottky electrode is known as the Schottky energy barrier. In a Schottky modulator, carriers are generated in the semiconductor by forward-biasing the modulator. That is, a positive potential is applied to the metal with respect to the n-type semiconductor for generating carriers and changing the refractive index of the semiconductor. This, in turn, changes the wavelength of light that is permitted to pass through the subwavelength nano-holes in the metal. Depending on the incident wavelength, such as near infrared, the metal can be replaced with a highly delta doped p layer with subwavelength nano-hole arrays.

Conventional optical modulators, including lithium niobate electro-optic modulators, III-V electro-absorption modulators, and silicon micro-ring modulators, all suffer from several other drawbacks as well. First, conventional optical modulators incorporating wavelength selectivity are relatively difficult to fabricate. The wavelength selectivity in these modulators is usually accomplished by either precision growth of III-V epitaxial films such as III-V electro-absorption modulators or complex fabrication techniques to generate extremely smooth curved surfaces in silicon and coupling out with an optical waveguide in the case of silicon micro-ring modulators. This is a very limiting factor in applications where space is a premium or the need for low cost is important, such as applications for computer chips. Second, the complex fabrication process used for conventional optical modulators is excessively time-consuming and expensive. Moreover, inexpensive conventional optical modulators, such as lithium niobate modulators, do not allow selected wavelengths of light to be modulated.

BRIEF DESCRIPTION OF THE DRAWINGS

Features of the present invention will become apparent to those skilled in the art from the following description with reference to the figures, in which.

DETAILED DESCRIPTION

Figure 1A:
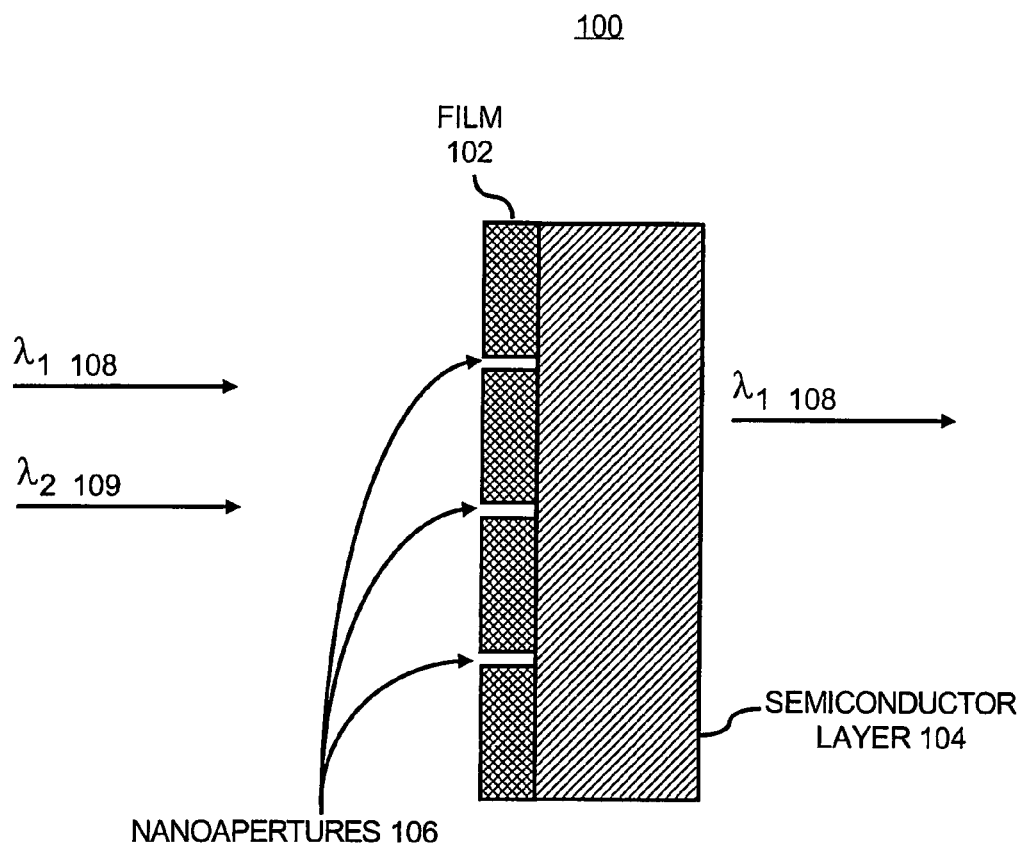
FIG. 1A illustrates a cross-sectional view of a structure having a film with nanoapertures and a semiconductor layer operable to modulate light, according to an embodiment.

For simplicity and illustrative purposes, the present invention is described by referring mainly to exemplary embodiments. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

Embodiments of structures and methods for detecting and modulating wavelengths of light are disclosed herein. The structures include a film having a plurality of nanoapertures, which are openings through the film configured to allow subwavelengths of light to be transmitted through the film. The film is generally metallic, however, in one example, the film may include a highly delta doped p-type semiconductor for operation in the near infrared subwavelengths. Subwavelengths of light are predetermined wavelengths of light ranging from 10 to 2000 nanometers (nm). Subwavelengths of light may refer to a specific wavelength, such as 436 nm, for example, or may also refer to narrow bands of wavelengths, such as 370-475 nm or 1300-1800 nm. While specific wavelengths are provided in these examples, a person having ordinary skill in the art will appreciate that subwavelengths of light may refer to other subwavelengths. Also, the nanoapertures may be configured to allow for the transmission of any predetermined subwavelengths of light through the film.

The structures described herein also include a semiconductor layer in connection with the film. For example, a surface of the semiconductor layer may be in direct contact with a surface of the film. The juxtaposition of the film and the semiconductor layer forms a Schottky contact and, when forward-biased, the film has a positive potential with respect to the semiconductor layer for an n-type semiconductor. When light is directed towards the film, the predetermined subwavelengths of light may pass through the nanoapertures and into the semiconductor layer. However, the electrical bias at the Schottky contact may be altered, thereby altering the carrier generation/depletion, to change the effective dielectric constant at the metal film-semiconductor interface, as discussed in greater detail below. This, in turn, modulates the light that is allowed to pass through the nanoapertures.

Modulating light includes altering an attribute of a wave of transmitted light. For example, modulating light may include increasing or decreasing the amplitude of the wavelength of light passing through the nanoapertures. Modulating may also include altering the transmission peak of the transmitted wavelength of light. For instance, a particular wavelength of light may be transmitting at 100% until it is modulated to transmit at 80%, 60%, etc.

The light may be modulated by altering the refractive index of the semiconductor layer. The refractive index of the semiconductor layer may be altered by carrier generation. Carrier generation refers to the generation of charge carriers, such as electrons and holes, which may be injected into the semiconductor layer to overcome the energy band gap of the semiconductor material, as is known in the art. A carrier generator may be used to initiate carrier generation by a number of different methods, including, but not limited to, optically, electrically, thermally, and chemically. For example, the refractive index of the semiconductor layer may be altered optically by directing another source of light towards the nanoapertures to initiate carrier generation and/or impinge on the nanoapertures. Impinging on the nanoapertures refers to reducing the transmission intensity of the light passing through the nanoapertures. In another example, the light may be modulated electrically by applying a voltage source to the semiconductor layer to deplete, or sweep out, carriers in order to change the refractive index.

The structures and methods described herein allow for the modulation of light with several advantages over previous optical modulators. For example, the structures described herein are highly wavelength sensitive. That is, the nanoapertures are configured to transmit only predetermined wavelengths of light. Thus, precise wavelengths of light may be modulated with a high degree of accuracy, as will be discussed in greater detail below. The structures described herein are also very compact. Therefore, a large number of structures may be placed on small surfaces, such as on computer chips. The structures described herein are also relatively easy to manufacture, because they require only a minimal number of different layers and materials.

FIG. 1A illustrates a cross-sectional view of a structure 100 having a film 102 and a semiconductor layer 104, according to an embodiment. The film 102 includes nanoapertures 106, which are openings through the film 102 configured to allow one or more predetermined subwavelengths of light to be transmitted through the film 102. For example, two different subwavelengths of light, such as $\lambda_1$ 108 and $\lambda_2$ 109 may be directed toward the film 102. The nanoapertures 106 may be configured to allow the transmission of $\lambda_1$ 108 and/or $\lambda_2$ 109 through the film 102. Thus, the nanoapertures 106 act as a filter by blocking the transmission of certain wavelengths of light through the film 102, while allowing for the transmission of only predetermined subwavelengths of light, such as $\lambda_1$ 108 and/or $\lambda_2$ 109. While FIG. 1A depicts three nanoapertures, the film 102 may contain less than three or many more nanoapertures than the three shown in FIG. 1A.

As described above, the nanoapertures 106 are subwavelength, because they are configured to allow a predetermined subwavelength, or narrow band of subwavelengths, of light to pass through the film 102. For example, the nanoapertures 106 may be configured to allow only $\lambda_1$ 108, which may be the red spectrum of light ranging from approximately 580 to 680 nm, with a peak transmission wavelength being approximately 627 nm, to be transmitted through the film 102. A person having ordinary skill in the art will appreciate that the nanoapertures 106 may be configured to allow any wavelength, or any band of wavelengths, of light to pass through the film 102.

Configuring the nanoapertures 106 to allow a predetermined subwavelength to pass involves adjusting the periodicity of the nanoapertures 106. Periodicity refers to the spacing between the nanoapertures 106. The wavelength that the nanoapertures 106 are configured to transmit may be directly related to periodicity. This is due, in part, to the generation of standing waves over the surface of the nanoapertures 106, which may be modified by altering periodicity to position the standing waves over the surface of the nanoapertures 106. The diameter and shape of the nanoapertures may also effect the wavelength that the nanoapertures 106 are configured to transmit. For instance, the wavelength that a nanoaperture 106 transmits is generally about ten times larger than the diameter of the nanoaperture 106, as discussed in greater detail below.

The geometric configuration of the nanoapertures 106 is not limited to circular. For instance, the nanoapertures 106 may be circular, oval, elongated slits, rectangular, etc. The nanoapertures 106 may also be patterned, corrugated, have annular rings, etc. For instance, the nanoapertures 106 may be surrounded with concentric circular grooves. Similarly, the nanoapertures 106 may each be configured to allow the same subwavelengths of light to pass through the film 102 or, alternatively, the film 102 may have nanoapertures 106 configured to allow any number of different subwavelengths of light to pass through the film 102. The nanoapertures 106 may be provided as an array of nanoapertures 106 in the structure 100. The array may be any shape, such as a square array or rectangular array. The nanoapertures 106 may also be provided as multiple arrays. Each array may be configured to allow a single subwavelength of the light 108 to be transmitted through the film 102. For example, each array may be configured to allow a single color spectrum to be transmitted through the film 102, such as red, green, blue, etc. In addition, a single modulator may have a chirped nanoaperture or a mixture of two or more sets of nanoapertures that can selectively detect multiple discrete wavelengths. For example, a single modulator may modulate wavelengths at 780 nm and 1550 nm only.

The nanoapertures 106 may have dimensions optimized for transmitting a particular subwavelength or optimized for a particular application. For instance, if the nanoapertures 106 are circular, they may have diameters ranging from 10 to 500 nm to detect different subwavelengths. In one embodiment, diameters of 155, 180, and 225 nm may allow for transmission of peak transmission wavelengths of 436, 538, and 627 nm, respectively. The nanoapertures 106 may be empirically configured to be approximately one-tenth the size of the wavelength of the light they are designed to pass. The nanoapertures 106 may be formed by any processes known in the art, including, but not limited to, any form of lithography, such as, electron beam or ion beam lithography and nanoimprinting lithography.

The film 102 may be formed from conductive materials, such as doped materials such as n- or p-type semiconductor and metals, for example, silver, gold, platinum, palladium, etc. The film 102 may be formed from a single material or from any combination of materials and may be homogenous or heterogeneous. The film 106 may have any dimensions. For example, in one embodiment, the film 106 may have a maximum thickness of approximately 50 nm. In other examples, the film 102 may have a thickness approximately within a factor of 5 of the diameter of the nanoapertures 106.

The semiconductor layer 104 operates to facilitate in the detection and modulation of the subwavelengths of light that are transmitted through the film 102 and may be formed from any semiconductor material or any combination of materials known in the art. For example, the semiconductor layer 104 may be formed from an n-type semiconductor by doping a valence-four semiconductor with valence-five elements in order to increase the number of free (in this case negative) charge carriers or any III-V semiconductors. P-type semiconductor may also be used with appropriate bias, as is known in the art. The semiconductor layer 104 may be joined to the film 102 by any process known in the art, including thermal techniques, electron-beam or chemical deposition of the film 104 on the surface of the semiconductor layer 104.

When the semiconductor layer 104 is connected to the film 102, the transmission spectra of the nanoapertures 106 may be tuned by adjusting the periodicity and symmetry of the film 102 for the dielectric of the semiconductor layer 104, as discussed above. For example, in a square array of nanoapertures 106 with a period of $a_0$ and peak transmissions of $\lambda_{max}$, the normal incidence transmittance spectra can be identified approximately from the dispersion relation given by the following equation:

$$\lambda_{max} = \frac{P}{\sqrt{\frac{4}{3}(i^2 + ij + j^2)}} \sqrt{\frac{\varepsilon_m \varepsilon_d}{\varepsilon_m + \varepsilon_d}}$$

where the indices i and j are the scattering orders from the array and P is the periodicity, or the lattice period, of the array. The dielectric constant of the semiconductor layer 104 may shift the eigen-frequencies by a factor of $f \approx \sqrt{\varepsilon_s}$ where $\varepsilon_s$ is the dielectric constant of the semiconductor material. Therefore, the nanoapertures 106 in the film 102 may be reconfigured to adjust to the effect of the semiconductor layer 104. For example, the nanoapertures 106 may be reduced in size by a factor of f, set forth in the equation above, such that the subwavelengths of light passing through the nanoapertures 106 are shifted to be in resonance with the semiconductor layer 104. Thus, the periodicity and size of the nanoapertures 106 are adjusted to allow for the predetermined subwavelengths of light, such as $\lambda_1$ 108, to pass through the film 102 into the semiconductor layer 104. For instance, as set forth above, the nanoapertures 106 may be approximately one-tenth the size of the wavelength and the periodicity, such as the number and placement of the nanoapertures 106 in an area, may be modified to determine the wavelength of the light that the nanoapertures 106 will pass. By forming the appropriate period for a standing wave of the surface plasmon, the light is enhanced at the nanoaperture 106 for that wavelength, much as the case for a photonic crystal structure.

The operation of the structure 100 is as follows. In an embodiment, the structure 100 is part of a photodetector operable to detect and modulate subwavelengths of light. For example, the structure 100 may allow for the detection of $\lambda_1$ 108, which may be a wavelength of 538 nm. However, a person having ordinary skill in the art will appreciate that $\lambda_1$ 108 may be any subwavelength or narrow band of subwavelengths. As FIG. 1A depicts, $\lambda_1$ 108 is applied to the structure 100. While FIG. 1A depicts only a single arrow representing $\lambda_1$ 108, it is to be understood that $\lambda_1$ 108 may be applied to the entire surface of the film 102 to contact each of the nanoapertures 106. $\lambda_1$ 108 may originate from any source and may be applied to the structure 100 in any form. One source may include a laser or similar devices capable of producing a beam of light.

When $\lambda_1$ 108 comes into contact with the film 102, $\lambda_1$ 108 may pass through the film 102, via the nanoapertures 106, to the semiconductor layer 104. The precise wavelength of $\lambda_1$ 108 is predetermined because the nanoapertures 106 are configured to allow only those subwavelengths of light to pass through the nanoapertures 106. Therefore, only $\lambda_1$ 108 may pass through the film 102. Thus, the structure 100 may act as a photodetector to detect a specific subwavelength of light if the light has an energy of photons exceeding the bandgap of the semiconductor. Alternatively, if the light has an energy below the bandgap of the semiconductor, the semiconductor is transparent to the light, such as $\lambda_1$ 108 in this case. When it is determined that any light has reached the semiconductor layer 104, the subwavelength of that light, $\lambda_1$ 108, is automatically known, because the nanoapertures 106 are configured to allow only predetermined subwavelengths of light to pass through the film 102 to reach the semiconductor layer 104.

$\lambda_1$ 108 may pass through the nanoapertures 106 by coupling to surface plasmons on the film 104. Surface plasmons are waves that propagate along the surface of a substrate, usually a metallic substrate or heavily-doped dielectric substrate. Surface plasmons have the ability to interact with light to allow photons of the light to couple to the surface plasmons. Thus, surface plasmons have the unique capacity to confine light to very small dimensions to propagate the light. The transmission of $\lambda_1$ 108 through the nanoapertures 106 without coupling to surface plasmons drops off as the fourth power of the ratio of the diameter of the nanoapertures 106 and $\lambda_1$ 108. However, with surface plasmon modes, if the nanoapertures 106 are arranged in an array where the period of the array is half the wavelength of the surface plasmon mode, a standing wave is formed and light is enhanced at the nanoaperture 106, thereby allowing enhanced transmission through the nanoapertures 106. In this manner, $\lambda_1$ 108 may pass through the film 102 by coupling to surface plasmons in the nanoapertures 106.

As set forth above, the structure 100 may also facilitate the modulation of a subwavelength of light, such as of $\lambda_1$ 108. For example, $\lambda_2$ 109 may be a modulating beam of light used as a carrier generator to modulate $\lambda_1$ 108. For example, $\lambda_1$ 108 may be a subwavelength of approximately 800 nm, while $\lambda_2$ 109 is a weaker light at a different wavelength, such as 200 nm. $\lambda_2$ 109 may modulate $\lambda_1$ 108 by modulating the amplitude of $\lambda_1$ 108. For example, $\lambda_2$ 109 may function as a carrier generator by initiating carrier generation and creating electron-hole pairs. When electron-hole pairs are injected into the semiconductor layer 104, they alter the refractive index and the resonant frequency of the film 102-semiconductor layer 104 interface, such that the nanoapertures 106 no longer pass light at the same wavelength. Thus, $\lambda_2$ 109 may modulate $\lambda_1$ 108 by altering the refractive index of the semiconductor layer 104 at the film 102-semiconductor layer 104 interface. $\lambda_2$ 109 may also modulate $\lambda_1$ 108 by controlling the transmission peak of $\lambda_1$ 108. For instance, $\lambda_2$ 109 may act like the gate of a transistor or the shutter of a camera by alternatively reducing and increasing the transmission peak of $\lambda_1$ 108. As $\lambda_2$ 109 impinges on the nanoapertures 106, the peak transmission $\lambda_1$ 108 may shift to 80%, 60%, and less.

The structure 100, depicted in FIG. 1, may also include multiple semiconductor layers. For example, the structure 100 may include an intermediate semiconductor layer (not shown) disposed between the film 102 and the semiconductor layer 104. The intermediate semiconductor layer may have a higher bandgap than the bandgap of the semiconductor layer 104 and may be used for tuning the nanoapertures 106 by altering the subwavelength of the light that the nanoapertures 106 are configured to allow transmission of. The nanoapertures 106 may be tuned, for example, by current injection, as set forth above. Embodiments having multiple semiconductor layers may be used in conjunction with a photodiode, such as a PIN (also known as p-i-n) semiconductor junction, where p is a p-type semiconductor, i is an intrinsic or not intentionally doped semiconductor, and n is an n-type semiconductor, as is known in the art. In this embodiment, nanoapertures may be formed in the p or n layer to act as a subwavelength filter, similar to the film 102. However, in this embodiment, the nanoapertures may filter infrared frequencies.

Figure 1B:
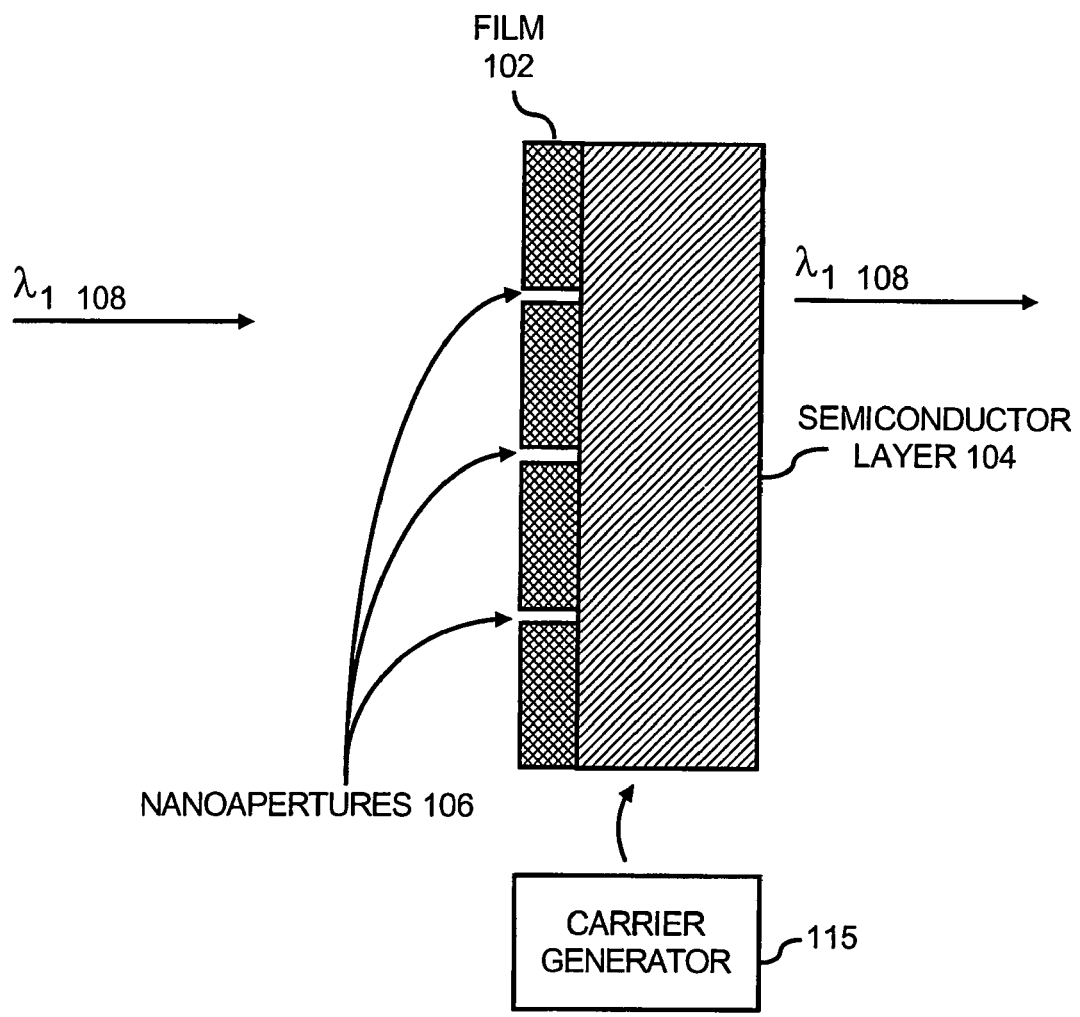
FIG. 1B illustrates a cross-sectional view of a structure having a film with nanoapertures and a semiconductor layer operable to modulate light, according to another embodiment.

FIG. 1B illustrates a cross-sectional view of a structure 111 having a film 102, a semiconductor layer 104, and a carrier generator 115, according to an embodiment. The film 102 and the semiconductor layer 104 may be substantially similar, or identical, to the film 102 and the semiconductor layer 104, described above with respect to FIG. 1A. The carrier generator 115 is a device for the generation of charge carriers, such as electrons and holes. The carrier generator 115 may include means for generating charge carriers either electrically, chemically, thermally, and/or biologically at the interface between the film 102 and the semiconductor 104. For example, the carrier generator 115 may include a voltage source for applying an electric current to the semiconductor layer 104, a heat source for increasing the temperature of the semiconductor layer 104, etc. The carrier generator 115 modulates a subwavelength of light, such as the $\lambda_1$ 108, by altering the refractive index of the semiconductor layer 104 at the film 102-semiconductor layer 104 interface in the same manner as the modulating light source described above.

Figure 1C:
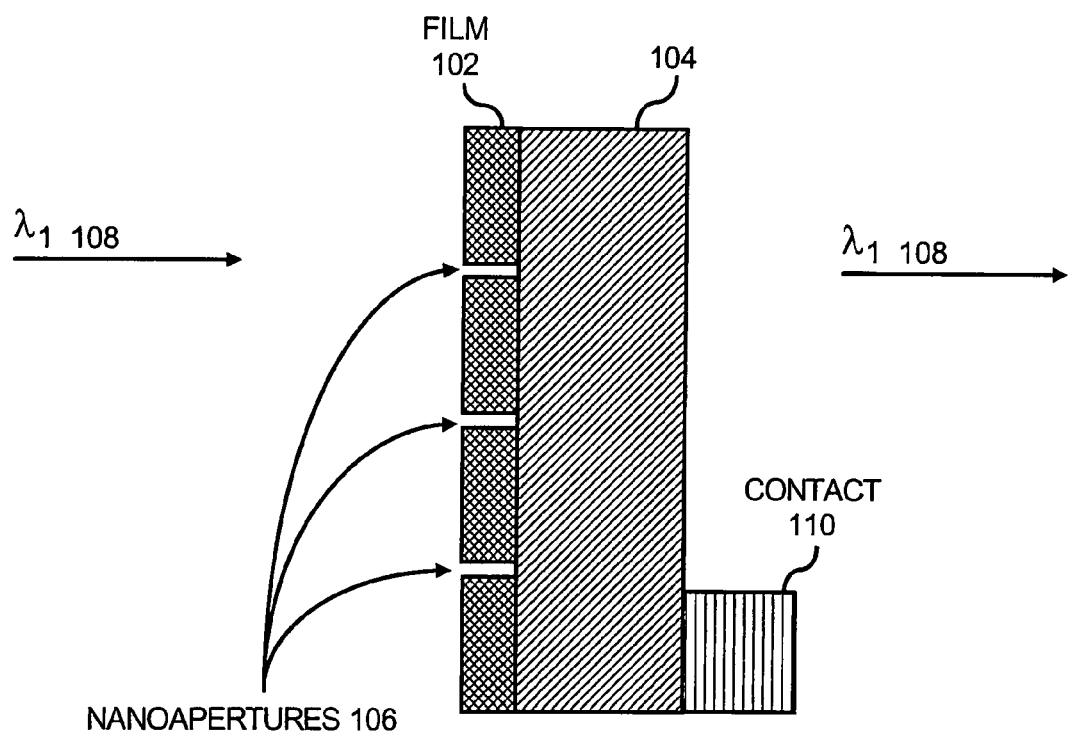
FIG. 1C illustrates a cross-sectional view of a structure having a film with nanoapertures, a semiconductor layer, and a contact operable to modulate light, according to an embodiment.

FIG. 1C illustrates a cross-sectional view of a structure 112 having a film 102, a semiconductor layer 104, and a contact 110, according to an embodiment. The film 102 and the semiconductor layer 104 may be substantially similar, or identical, to the film 102 and the semiconductor layer 104, described above with respect to FIG. 1A. The contact 110 may be an ohmic contact or a region on the structure 112 that has been prepared so that the current-voltage (I-V) curve of the structure 112 is linear and symmetric. That is, the contact 110 may be a metallic material that creates an ohmic metal-semiconductor junction that does not rectify current. FIG. 1C depicts the contact 110 in connection with, and extending only partially along, the surface of the semiconductor layer 104 to allow light to transmit through the structure 112. However, a person having ordinary skill in the art will appreciate that the contact 110 may be any reasonably suitable size and may be larger than the contact 110 depicted in FIG. 1C with openings in the contact 110 to allow light to pass through the structure 112.

In another embodiment, the contact 110 may cover the whole back surface of semiconductor layer 104 to make an equipotential surface with the homogeneous Schottky barrier. One may use, for instance, transparent indium tin oxide (ITO) to form the contact 110 covering the entire back surface of the semiconductor layer 104. When predetermined subwavelengths of light, such as $\lambda_1$ 108, having photon energy exceeding the (direct) bandgap of the semiconductor layer 104 are transmitted through the nanoapertures 106 electron-hole pairs are created in the semiconductor layer 104 and absorb incident photons from the predetermined above bandgap light, which in this case is reverse-biased to sweep the electrons into the contact 110, resulting in a photocurrent in the external circuit. This photocurrent may be detected to determine that the light has reached the semiconductor layer 104. The subwavelength of the above bandgap light is automatically known when it is determined that light has reached the semiconductor layer 104, because the nanoapertures 106 are configured to allow only those subwavelengths of the light to be transmitted through the film 102, as described above. However, if the photon energy is less than the bandgap of the semiconductor layer 104, the semiconductor layer 104 will be transparent to the photons and no photocurrent will be generated or detected. By forward-biasing the film 102, when the film 102 is metal or a p-type semiconductor, with respect to the n-type semiconductor layer 104, carrier generation at the film 102-semiconductor layer 104 interface will change the transmission characteristics of the nanoapertures 106, resulting in modulation of the impinging photons. Any suitable materials and processes known in the art for creating an ohmic contact may be used to create the contact 110. For example, the contact 110 may be a sputtered or evaporated metallic pad that is patterned using photolithography.

Although not illustrated in FIG. 1C, the structure 112 may also include a measuring device for detecting and/or reading the photocurrent created in the structure 112. For example, the measuring device may include an ampere meter connected to the contact 110 to detect a change in current responsive to the generation of the photocurrent in the semiconductor layer 104 due to the transmission of the light through the nanoapertures 106. In another embodiment, a voltmeter may be used to measure the change in voltage across a load resistor due to the photocurrent generated in the semiconductor layer 104.

Figure 1D:
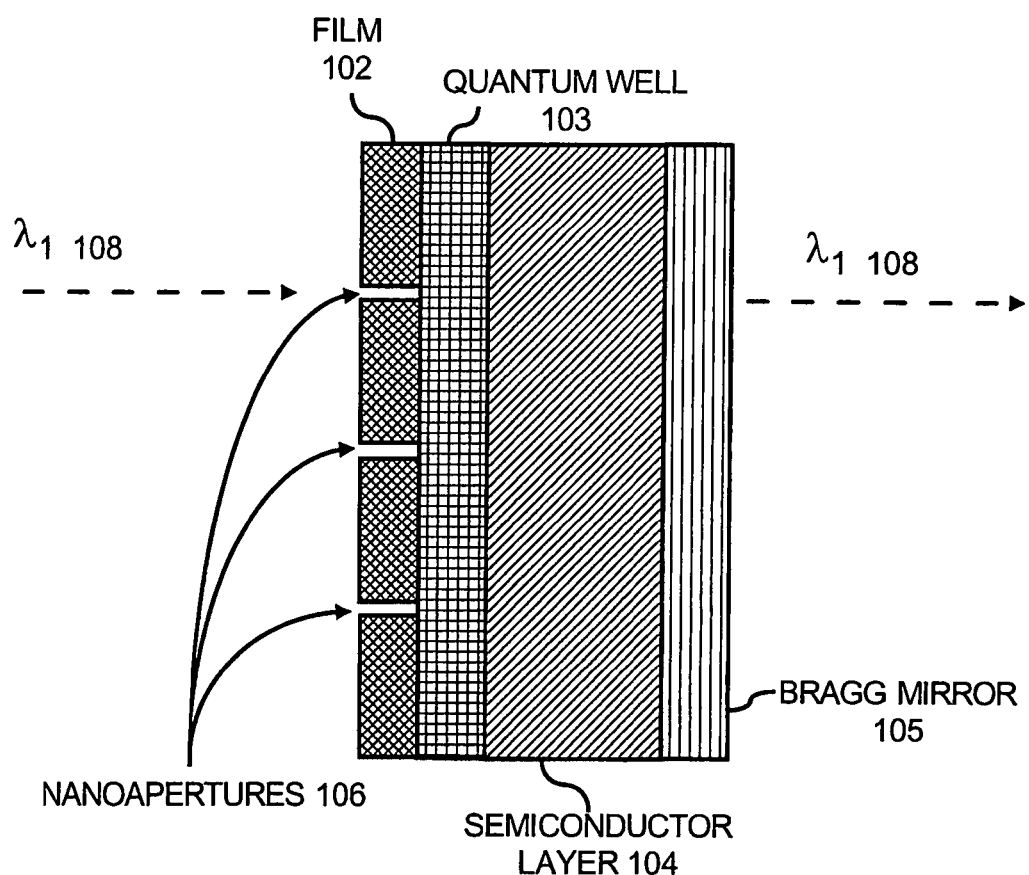
FIG. 1D illustrates a cross-sectional view of a structure having a film with nanoapertures, a semiconductor layer, a quantum well, and a Bragg mirror operable to modulate light, according to an embodiment.

FIG. 1D illustrates a cross-sectional view of a structure 113 having a film 102, a semiconductor layer 104, a quantum well 103, and a Bragg mirror 105, according to an embodiment. The film 102 and the semiconductor layer 104 may be substantially similar, or identical, to the film 102 and the semiconductor layer 104, described above with respect to FIG. 1A. The quantum well 103 represents a potential well for providing gain to compensate for any optical loss such as insertion loss. The quantum well 103 may be forward-biased to provide gain which is broadband, as is known in the art. The Bragg mirror 105 is any structure utilizing Bragg reflection principles to inhibit light, such as $\lambda_1$ 108, from passing through the Bragg mirror 105 to create a resonant modulator where the extra round trips of the photon to the gain region increase the intensity, as is known in the art. For example, although depicted in FIG. 1D as a single layer, the Bragg mirror 105 may include an alternating sequence of layers of two different optical materials, with each optical layer thickness corresponding to one quarter of the wavelength for which the Bragg mirror 105 is designed. The quantum well 103 and the Bragg mirror 105 may be used to generate gain. That is, the quantum well 103 and the Bragg mirror 105 may be used to increase the total intensity output of the structure 113 in relation to the intensity input into the structure 113, as is known in the art. The structure 113 is depicted as having both the quantum well 103 and the Bragg mirror 105. However, the quantum well 103 and the Bragg mirror 105 may be used alone or in conjunction with each other in any of the structures depicted in FIGS. 1A-D.

Figure 2:
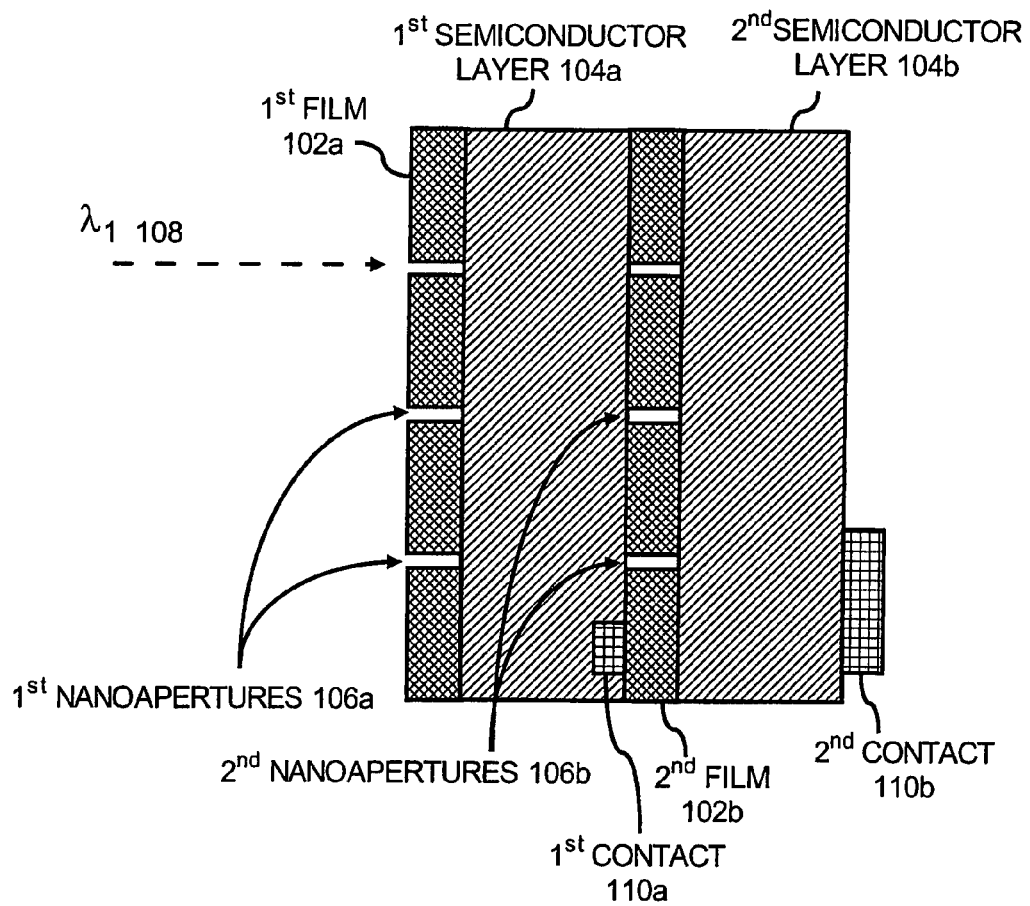
FIG. 2 illustrates a cross-sectional view of a structure having multiple films and semiconductor layers arranged in series, according to an embodiment.

FIG. 2 illustrates a cross-sectional view of a structure 200, according to an embodiment. The structure 200 includes a first film 102a having first nanoapertures 106a, a first semiconductor layer 104a, and a first contact 110a, which may be substantially similar to the structure 112, depicted in FIG. 1C. The structure 200 also includes a second film 104b having second nanoapertures 106b, a second semiconductor layer 104b, and a second contact 110b, which also may be substantially similar to the structure 100. Therefore, the structure 200 may be, essentially, the structure 100 arranged in series with another structure 100. While FIG. 2 depicts two arrows pointing to the nanoapertures 106a and 106b, it is to be understood that FIG. 2 shows three apertures and that a third arrow is omitted for simplicity. Furthermore, the light depicted in FIG. 2 may be applied to the entire surface of the film 102 to contact each of the nanoapertures and the film 102 may contain less than three nanoapertures or more nanoapertures than the three shown in FIG. 2. The first contact 110a is depicted as being smaller than the second contact 110b, such that the first contact 110a does not obstruct light, such as the $\lambda_1$ 108 from passing through the second film 102b. However, the first and second contacts 110a and 110b may be any reasonably suitable size so long as the first contact 110a does not obstruct the second nanoapertures 106b. For instance, either or both of the first and second contacts 110a and 110b may extend the entire length of the structure 200 and be formed of a transparent ITO, as set forth above with respect to FIG. 1C. The first contact 110a is shown in FIG. 2 as embedded in the first semiconductor layer 104a. In this example, the first semiconductor layer 104a may contain vias to allow a measuring device to access the first contact 110a. In other examples, the first contact 110a may not be embedded in the first semiconductor layer 104a, but may be connected to an outer region of the first semiconductor layer 104a.

The use of multiple films arranged in series, as shown in FIG. 2, allows light to be not only detected and modulated, but also analyzed. For instance, light is applied to the first film 102a and the first nanoapertures 106a are configured to allow predetermined subwavelengths of the light, such as $\lambda_1$ 108, to be transmitted through the first film 102a. The transmitted $\lambda_1$ 108 may pass through the first semiconductor layer 104a and into the second film 102b.

In one embodiment, the first nanoapertures 106a of the first film 102a are configured to transmit different subwavelengths of light than the second nanoapertures 106b of the second film 102a. For example, the first nanoapertures 106a may be configured to transmit $\lambda_1$ 108, which may be approximately 436 nm, while the second nanoapertures 106b are configured to transmit a light of approximately 538 nm. The first semiconductor layer 104a and the second semiconductor layer 104b may have different bandgaps. Thus, the structure 200 may be configured to detect different subwavelengths of the light 108.

In the example described above, $\lambda_1$ 108 of 436 nm would normally not be detected at the second semiconductor layer 104b, because the first and second nanoapertures 106a and 106b are configured to transmit different subwavelengths of light. That is, a 436 nm light is transmitted through the first film 102a via the first nanoapertures 106a, but cannot pass through the second nanoapertures 106b of the second film 102b because the second nanoapertures 106b are configured to pass a 538 nm subwavelength. Therefore, the 436 nm subwavelength is blocked by the second film 102b.

However, the first film 102a may be associated with a contaminant, such as a biological or chemical substance. For example, an organic molecule may bind to the metallic surface of the first film 102a. This interaction between the organic molecule and the first film 102a may modify the resonance and refractive index of the first film 102a, leading to a shift in the transmission subwavelength of the first nanoapertures 106a. For instance, the organic molecule may modify the resonance of the first film 102a by altering the dimensions of the first nanoapertures 106a. This shift may cause the first nanoapertures 106a to allow transmission of a different subwavelength of light than the first nanoapertures 106a were originally configured to allow transmission of. Thus, if the first nanoapertures 106a were originally configured to allow transmission of $\lambda_1$ 108 of approximately 436 nm, the contaminant interacting with the first film 102a may cause the first nanoapertures 106a to allow transmission of a subwavelength of 538 nm. Therefore, in this example, the 536 nm subwavelength of light is transmitted through both the first and second films 102a and 102b. Detection of the light at the second semiconductor layer 104b provides a determination that a contaminant is interacting with the first film 102a.

In this manner, the first film 102a functions as a detector, while the second film 102b functions as an analytical filter. The first film 102a detects the presence of the contaminant by either blocking the transmission of the 536 nm subwavelength of light, described in the example above, or transmitting a shifted subwavelength of the 536 nm light. The second film 102b may analyze the shift in the light by allowing for the transmission of the shifted light to the second semiconductor layer 104b, thereby providing a determination of what the subwavelength of the light has been shifted to. Knowing the shifted light may provide for the identification of the contaminant. For example, a shift from 436 nm to 538 nm may suggest that the organic molecule causing the shift is a particular [e.g. DNA] molecule. Alternatively, if the 538 nm light is not detected at the second semiconductor layer 104b, then a determination is provided that the contaminant is not associated with the first film 102a. Thus, the structure 200 operates as a detector operable to detect a contaminant associated with a film.

The structure 200 may also act as a tandem push-pull modulator. That is, the structure 200 may be two modulators placed in series and photons impinging on the structure 200 will have energy less than the bandgap of the semiconductor layers 104a and 104b. The structure 200 may then be forward-biased to generate carriers at the film 102-semiconductor layer 104 interface when the film 102 is a metal or a p-type semiconductor material and the semiconductor layer 104 is an n-type semiconductor material. The structure 200 may operate in a push-pull mode to reduce the operating current/voltage necessary to modulate the incident photons at an acceptable modulation depth of better than 10 dB. In the push-pull mode, one modulator, such as the first film 102a and first semiconductor layer 104a, may be in depletion mode while the other modulator, such as the second film 102b and the second semiconductor layer 104b, is in accumulation mode such that applying forward and reverse bias respectively will bring the two modulators to maximum transmission.

A person having ordinary skill in the art will appreciate that while examples of specific subwavelengths are recited above to describe various embodiments, that the first and second nanoapertures 106a and 106b may be configured to allow transmission of any light. Similarly, differently configured nanoapertures may be used in any combination in the first and second films 102a and 102b. For instance, the first nanoapertures 106a may be configured to transmit a specific narrow band of subwavelengths, while the second nanoapertures 106b are configured to transmit multiple different narrow bands of subwavelengths.

Figure 3:
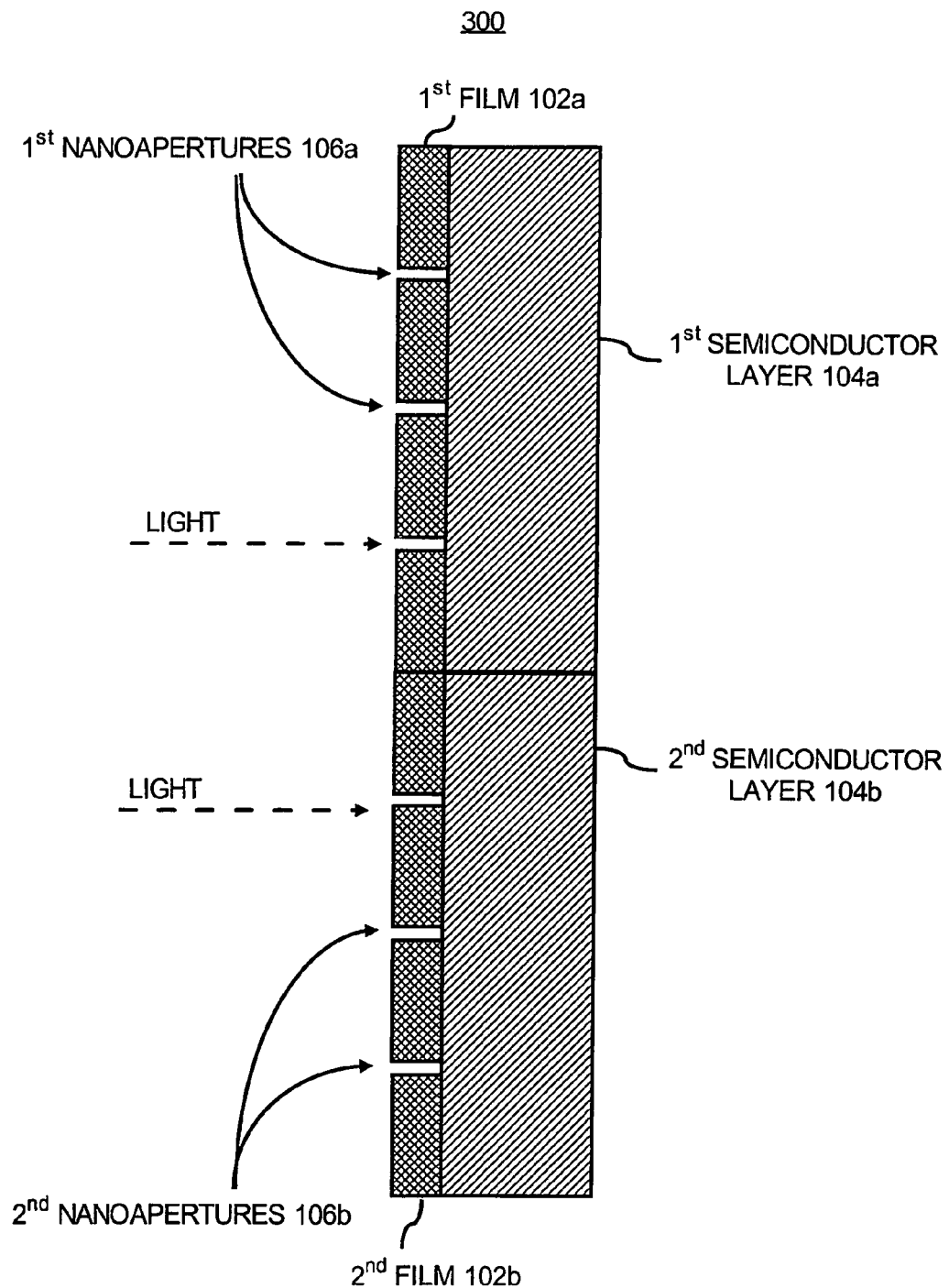
FIG. 3 illustrates a cross-sectional view of a structure having multiple films and semiconductor layers arranged in parallel, according to an embodiment.

FIG. 3 illustrates a cross-sectional view of a structure 300, according to an embodiment. The structure 300 includes a first film 102a having first nanoapertures 106a and a first semiconductor layer 104a, which may be substantially similar to the film 102 and the semiconductor layer 104 of the structure 100, depicted in FIG. 1. The structure 300 also includes a second film 104b having second nanoapertures 106b and a second semiconductor layer 104b, which also may be substantially similar to the structure 100. In fact, the structure 300 may be a single integrated device, such as an elongated version of the structure 100. That is, the first and second films 102a and 102b may be virtually identical, while the first and second semiconductor layers 104a and 104b may also be virtually identical. Therefore, the structure 300 may also be, essentially, the structure 100 arranged in parallel with another structure 100. The structure 300 may be two structures 100 joined together, rather than an elongated version of the structure 100, because joining the two structures may be a more efficient manufacturing process than fabricating an elongated version of the structure 100. Although not illustrated, the structure 300 may also contain first and second contacts 110a and 110b, substantially similar to the first and second contacts 110a and 110b depicted in FIG. 2.

The use of multiple films arranged in parallel in the structure 300 allows for the capture of a broader range of spectral information. For example, the spacing and configurations of the first and second nanoapertures 106a and 106b may be altered to allow different wavelengths to pass through the structure 300. For instance, the diameter of the first nanoapertures 106a may be increased, reduced, and/or changed in shape to allow for the transmission of a first predetermined subwavelength of light, such as $\lambda_1$ 108, while the configuration of the second nanoapertures 106b may be increased, reduced, and/or changed in shape to allow for the transmission of a different predetermined subwavelengths of light, such as $\lambda_2$ 109. Altering the spacing and configuration of the first and second nanoapertures 106a and 106b allows for more spectral information to be obtained, because the structure 300 is operable to modulate multiple different subwavelengths.

Although not illustrated, the structure 300 may also include additional films and semiconductor layers arranged in series with the structure 300. For instance, in an embodiment, the structure 300 may resemble the structure 200, depicted in FIG. 2. That is, the structure 300 may have multiple films arranged in series, where the multiple films act as detectors and analyzers, as set forth above. Moreover, the structures 200 and 300 may contain the quantum well 103 and/or the Bragg mirror 105, described above with respect to FIG. 1D.

Figure 4:
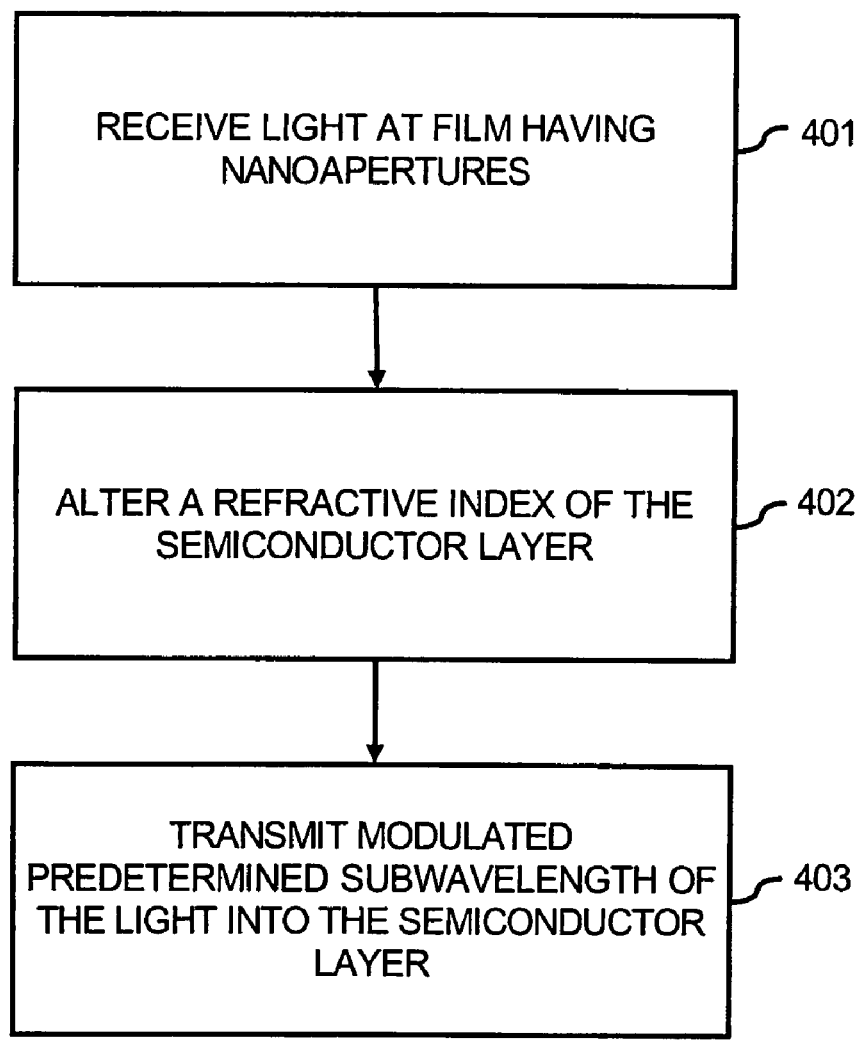
FIG. 4 illustrates a flow chart of a method for detecting a wavelength of light, according to an embodiment.

FIG. 4 illustrates a flow chart of a method 400 for modulating a subwavelength of light, according to an embodiment. For example, the method 400 may be used in conjunction with the structures 100-113, illustrated in FIGS. 1A-D to modulate a predetermined subwavelength of light. The method 400 is described with respect to FIGS. 1-3, by way of example and not of limitation. A person having ordinary skill in the art will appreciate that additional steps may be added to the method 400 and, similarly, that some of the steps outlined in FIG. 4 may be omitted, changed, or rearranged without departing from a scope of the method 400.

At step 401, the method 400 includes receiving light at a film 102 having a plurality of nanoapertures 106. The film 102 may have any number of nanoapertures 106 configured to detect any different number of subwavelengths of the light, including a single subwavelength or a range of subwavelengths. The film 102 may also include multiple films arranged either in series or in parallel, as depicted in FIGS. 2 and 3, respectively. The film 102 may be associated with a semiconductor layer 104.

At step 402, a refractive index of the semiconductor layer 104 is altered to modulate the predetermined subwavelength of light. The refractive index may be altered by inducing carrier generation through any of the methods described above, including, but not limited to, optically, electrically, thermally, chemically, and biologically. For example, a modulating beam of light 109 may be applied to the film 102 or a carrier generator 115, such as a voltage source, may be used to induce carrier generation.

At step 403, the modulated predetermined subwavelength of light, such as $\lambda_1$ 108, is transmitted into the semiconductor layer connected to the film 102. The modulated predetermined subwavelength of light may be transmitted through the film 102 via at least one of the plurality of nanoapertures 106. In further steps, not illustrated in FIG. 4, the modulated predetermined subwavelength of light may be detected. When light is detected, the wavelength of the light may be automatically determined, as described above. The method 400 may be practiced with a structure having a contact 110, such as the structure 112 depicted in FIG. 1C. The contact 110 may be an ohmic contact, for example, and may create a Schottky junction between the semiconductor-contact interface. The creation of the Schottky junction may facilitate detection of the predetermined wavelength of light transmitted through the film 102, because transmission of the light may cause a photocurrent to flow from the semiconductor layer 104 to the contact 110. This photocurrent may be detected, thereby providing a determination that the predetermined wavelength of light has been transmitted through the nanoapertures 106.

The structures described herein may be useful in a variety of different applications. For instance, the structures may be used in information processing, sensors, and in laser data transmission applications. In one embodiment, the structures may function as a transistor by modulating and controlling the flow of information represented by different subwavelengths of light. In another embodiment, the methods and structures described herein may be used in a laser application.

While the embodiments have been described with reference to examples, those skilled in the art will be able to make various modifications to the described embodiments. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A modulator comprising:
    a film having a plurality of nanoapertures to allow the transmission of a predetermined subwavelength of light through the film via the nanoapertures while blocking other wavelengths of light;
    a semiconductor layer in connection with the film to facilitate detection of the predetermined subwavelength of the light transmitted through the film; and
    a carrier generator to apply a modulating beam of light other than the light transmitted through the film into the semiconductor layer to modulate the predetermined subwavelength of light transmitted through the semiconductor layer.

2. The modulator of claim 1, wherein the predetermined subwavelength of light is below a bandgap of the semiconductor layer and the modulating beam of light is above the bandgap of the semiconductor layer.

3. The modulator of claim 1, wherein the modulating beam of light is weaker and a different wavelength from the predetermined subwavelength of light.

4. The modulator of claim 1, wherein the carrier generator alters the refractive index of the semiconductor layer.

5. The modulator of claim 1, wherein the plurality of nanoapertures have an Eigen-frequency which is shifted by a factor of f depending on a dielectric constant of their environment.

6. The modulator of claim 1, further comprising at least one selected from a quantum well and a Bragg mirror.

7. The modulator of claim 1, further comprising:
a gain generating device to generate gain in the semiconductor layer to increase a signal to noise ratio of an electrical signal in the semiconductor layer.

8. A method of modulating light comprising:
receiving light at a surface of a structure, wherein the structure includes a film having a plurality of nanoapertures to allow the transmission of a predetermined subwavelength of the light through the plurality of nanoapertures while blocking other wavelengths of light, and a semiconductor layer in connection with the film, wherein the light is transmitted through the film to the semiconductor layer; and
applying a modulating beam of light other than the light transmitted through the film into the semiconductor layer to cause modulation of the predetermined subwavelength of the light transmitted through the semiconductor layer.

9. The method of claim 8, wherein receiving light comprises:
receiving light below a bandgap of the semiconductor layer; and
wherein applying the modulating beam of light further comprises applying a modulating beam of light that is above the bandgap of the semiconductor layer.

10. The method of claim 8, further comprising:
detecting the transmission of the modulated predetermined subwavelength of the light through the film.

11. The method of claim 10, wherein detecting the transmission of the modulated predetermined subwavelength of the light comprises:
detecting a photocurrent at the semiconductor layer, wherein the photocurrent is generated in the semiconductor layer in response to the modulated predetermined subwavelength of the light transmitted through the semiconductor layer.

12. The method of claim 8, wherein the film is to allow the predetermined wavelength of light to couple to surface plasmons in the film.

13. The method of claim 8, wherein the plurality of nanoapertures have an eigen-frequency which is shifted by a factor of f depending on a dielectric constant of their environment.

14. The method of claim 8, further comprising:
generating gain in the semiconductor layer using at least one selected from a quantum well and a Bragg mirror.

15. A system comprising:
a first modulator including
a filter having a plurality of nanoapertures to allow the transmission of a predetermined subwavelength of light through the filter via the nanoapertures, while blocking other wavelengths of light, and
a semiconductor layer in connection with the filter to facilitate in the generation of a photocurrent from the light transmitted through the plurality of nanoapertures of the filter;
a contact connected to the modulator and a measuring device to detect the photocurrent; and
a carrier generator to apply a modulating beam of light other than the light transmitted through the filter to modulate the predetermined subwavelength of light transmitted through the semiconductor layer.

16. The system of claim 15, further comprising:
a second modulator having a second filter and a second semiconductor layer, wherein the modulator is operable to be in a depletion mode while the second modulator is operable to be in an accumulation mode.

* * * * *